Inventor
P. A. TAYSOM-
R. E. KIRK
By
Attorney

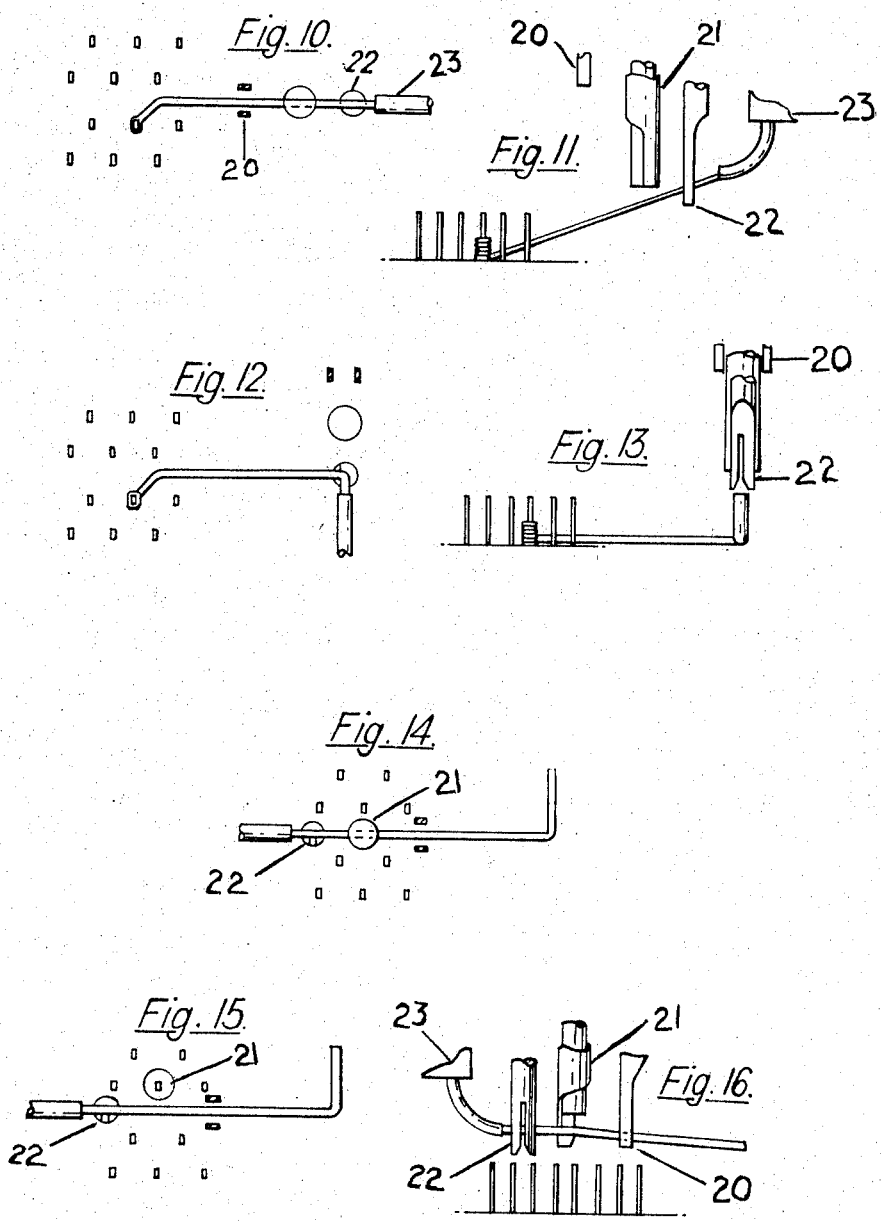

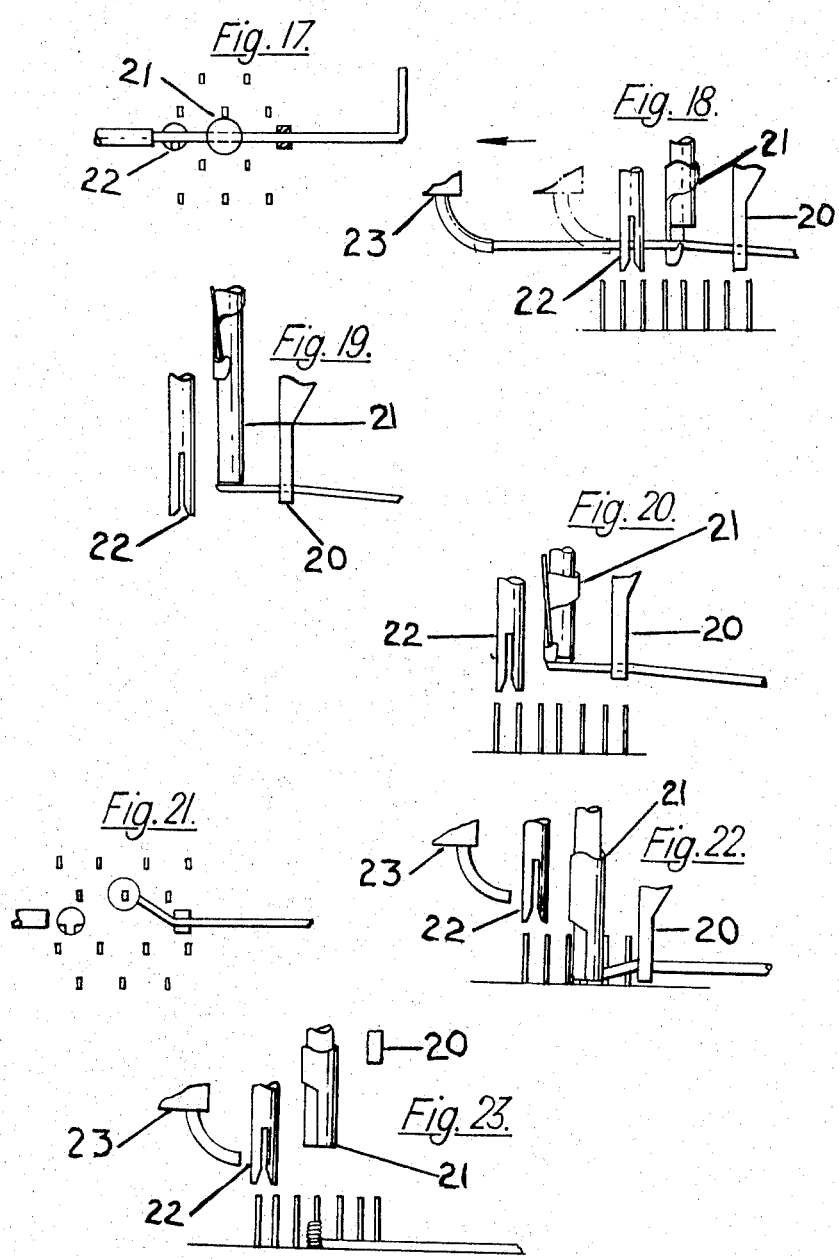

United States Patent Office 3,435,858
Patented Apr. 1, 1969

3,435,858
WIRE WRAPPING MACHINE
Patrick Arnold Taysom and Robert Edwin Kirk, London, England, assignors to International Standard Electric Corporation, New York, N.Y., a corporation of Delaware
Filed July 26, 1966, Ser. No. 567,998
Int. Cl. B21f 3/12, 45/00; H01r 9/22
U.S. Cl. 140—92.1                 12 Claims

ABSTRACT OF THE DISCLOSURE

Machines for automatically wiring electrical circuit boards. The machines have head units which include wire-wrapping devices, wire feed devices, and wire-bending devices. The wire-wrapping devices are equipped to strip the wires. The wire feed devices are able to move transversely relative to the board and are equipped to cut the wire. The heads are capable of rotating about the wire bending devices. The board is mounted on a tape controlled table which moves in a coordinate manner to position the board with respect to the head unit.

---

Figure 1:
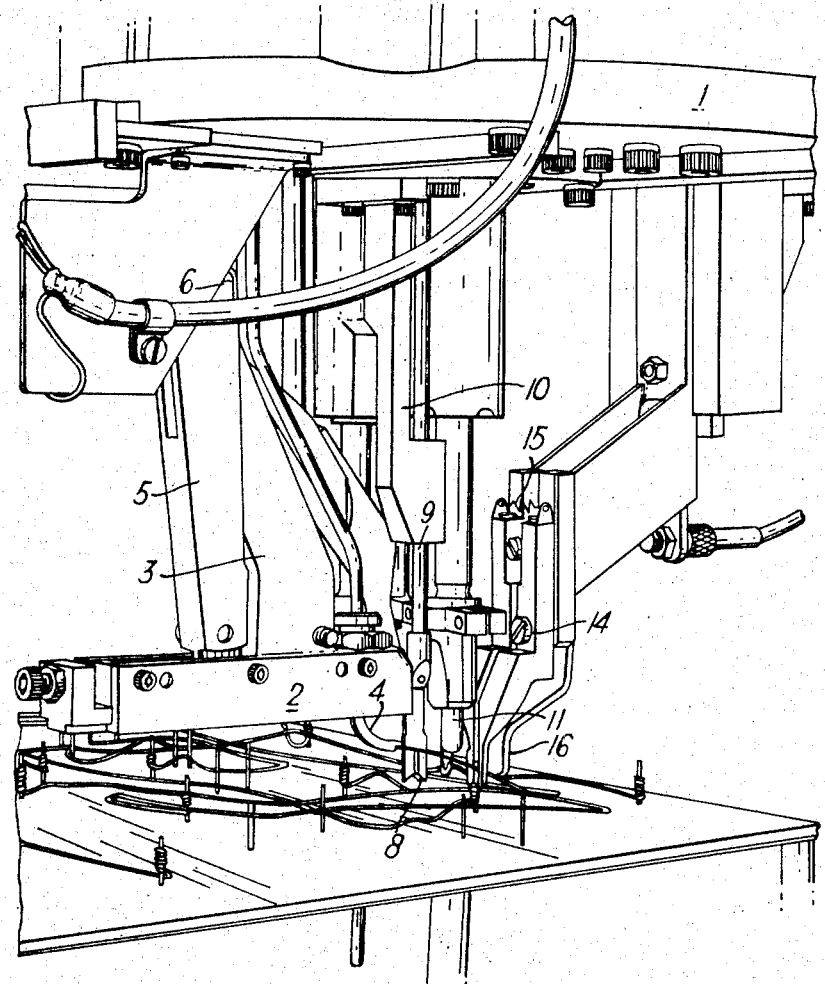

The present invention relates to a head unit for a wire-wrapping machine for applying wire to a number of terminal posts on an electrical circuit board.

It is an object of this invention to provide a head unit and wire-wrapping machine which together are capable of economically and automatically making conductive connections between wire conductors and respective ones of the terminals of a circuit board that is to be wired according to a predetermined plan or circuit diagram.

According to the present invention, there is provided a head unit for a machine for wiring an electrical circuit board, which unit includes a wire-wrapping device, a wire-feed device adapted to feed wire to said wrapping device and for completing connections between terminals on a board being wired, a bending device for bending wire so that the direction in which a wire crosses a board being wired may be changed, and control arrangements for said wrapping device, said feed device and said bending device, the arrangement being such that terminals on a board being wired may be interconnected in accordance with a predetermined pattern.

An embodiment of the present invention will now be described with reference to the accompanying drawings, in which FIGURES 1 and 2 respectively show the main elements of the head unit in two different positions, and FIGURES 3 to 23 inclusive are schematic diagrams showing successive stages in the operation of interconnecting a number of terminal posts by a length of wire to be wrapped to each of those posts.

A machine, with which the head unit to be described herein is used, consists of four units, a numerically controlled co-ordinate positioning table, a control unit for the table, the wrapping head and its associated hydraulic control gear, and a control unit for the head. The table and its control gear can follow conventional practice and so are neither described in detail nor illustrated.

The wrapping head contains all of the mechanism needed to feed out the wire from a reel of wire on the machine, to strip off its insulation at the points where wrapped joints are to be made, to cut the wire as necessary, and to make the wrapped joints. This mechanism is all hydraulically controlled, the pump and valve gear for the hydraulics being mounted on the side of the machine and connected to the hydraulic cylinders of the head by flexible nylon tubes. These tubes are flexible to allow for the rotation of the wrapping head which is needed to bend the wire and change its direction, as necessitated by the layout of the terminals and the desired wiring paths therebetween.

The table is controlled via its control gear by reading data, relating to the wrapping operation, from punched tape (although magnetic tape is a feasible alternative), the data so read controlling both the table-positioning arrangements and the hydraulic cylinders of the head, the latter via the head's control unit. The control unit has a manual control panel which can be used, with a patch-board plug system to manually operate any of the functions of the head, either a step at a time or in a continuous sequence. This is useful for setting up the machine and also for fault location. There are also test points for the switches in the head which respond to changes in the positions of the various movable elements of the head, the operations of these switches serving to transmit signals to the control gear indicative of the condition of the head.

Figure 2:
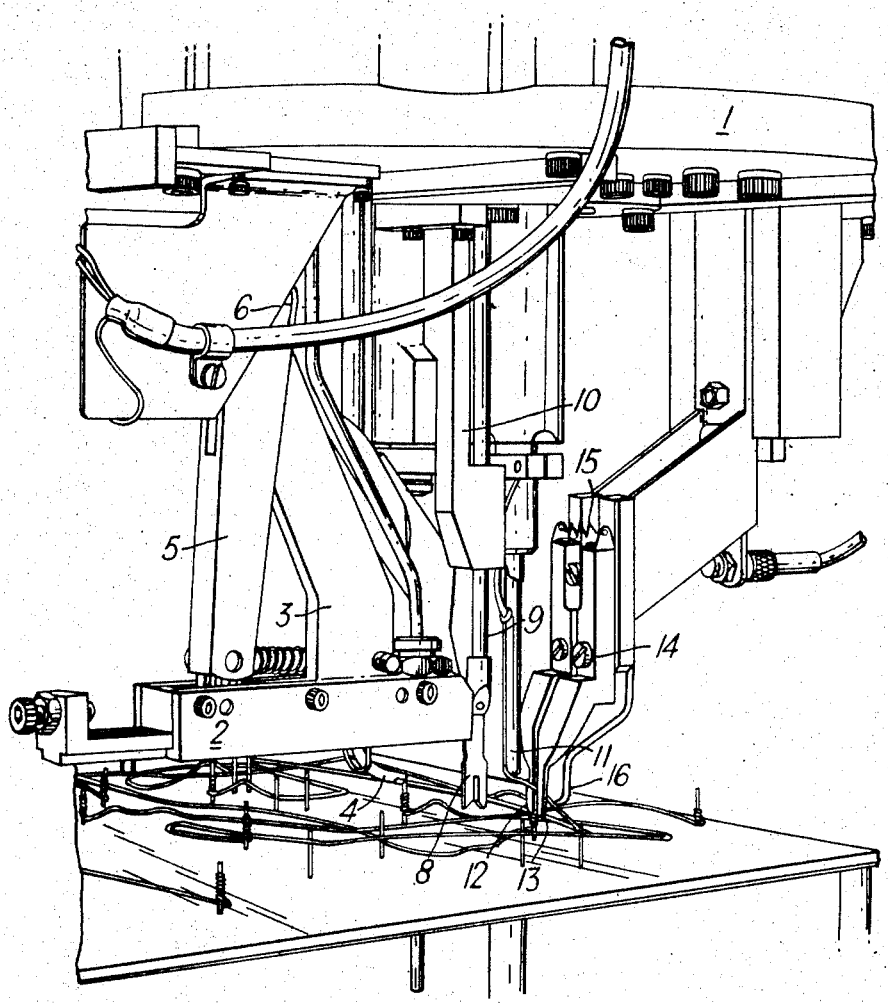

Referring to FIGURES 1 and 2, the head unit includes a lower main plate 1 which is parallel to an upper main plate (not shown), the hydraulic cylinders being between these two plates. The operative elements of the head are all mounted on the lower surface of the plate 1.

The operative elements include a wire-feeding device, a bending fork, a wrapping tool and a pair of grippers. The use to which these devices are put will become clear from the following operational description.

The wire-feeding device includes a support 2 mounted to the plate 1 by means of a girder 3, there being a feed tube 4 projecting below the support 2. This feed tube, which incorporates a wire cutter, can be moved to and fro along the support 2 by an operating lever 5 pivoted at point 6 to a bracket also mounted on the plate 1. Fluid for operating the lever 5 is conveyed to the cylinder therefor by a nylon tube (not shown). It will be noted that the feed tube 4 appears in two different positions in FIGURES 1 and 2, respectively.

The bending fork is more conveniently seen in FIGURE 2 than in FIGURE 1. The bending fork has a forked end 8 on the lower end of a shaft 9, this shaft being journalled in a bracket on another girder 10.

The wire-wrapping device 11 is a combined wire-wrapping tool and wire stripper. This device has two concentric cylindrical portions of which the outer one is movable longitudinally with respect to the inner one during wrapping. This device is shown in FIGURES 1 and 2 in two different states.

The grippers include two gripping fingers 12 and 13 which can be moved apart, i.e. the grippers can be opened or closed. The two fingers are pivoted by the bolts indicated at 14, and the upper ends thereof are coupled by a coil spring 15. The grippers have an angle member 16 backing them. The terminals to be wrapped are represented by the small unreferenced rectangles in FIGURE 3 and other plan views, and by the uprights in views such as FIGURE 4.

The operation of the head unit will now be described with reference to the schematic FIGURES 3 to 23, in which the grippers are referenced by the numeral 20. Other members of the head unit are the bit 21, the bending fork 22 and the feed tube 23.

The wire is fed from an unreeler on the main body of the machine into the feed tube 23, this tube directing the wire in a plane parallel to the table of the machine.

Figure 3:
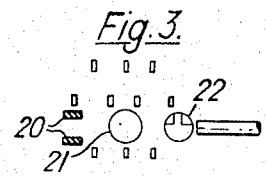

At the beginning of a cycle in which a length of wire is to be wrapped on two or more terminals, the table with the electrical circuit board on it is moved to place the head in a starting position for the first of those terminals. The head is rotated so that it is oriented in the correct manner as shown in FIGURE 3. At the same time, the feed rollers (not shown) are driven to feed out a predetermined length of wire from the feed tube 23 into the stripping notch of the bit 21. At this time, the grippers are open and are withdrawn upward, their lower ends being then above the level of the support 2 of FIGURE 1.

Figure 4:
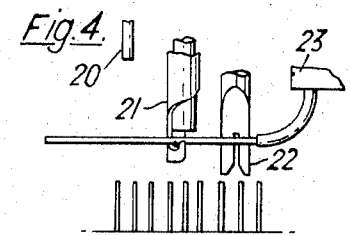
Figure 5:
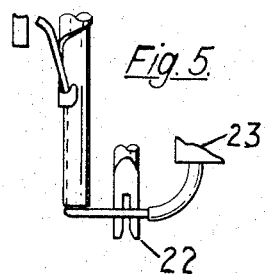

In this condition, which is shown schematically in FIGURE 4, the outer sleeve of the bit 21 is moved upward with respect to the inner portion of the bit so that the condition shown in FIGURE 5 is reached, the movement of the outer sleeve stripping the insulation from the end portion of the wire. The stripped-off insulation is blown off the bit, so that the bared wire is held in the bit as shown in FIGURE 5.

Figure 6:
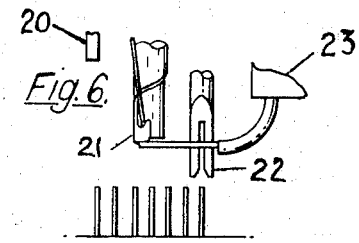
Figure 7:
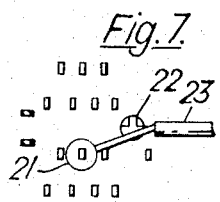

After the insulation has been stripped, the stripping sleeve is lowered to the bottom of the bit, at which time the operative elements of the head are moved closer to the circuit board to be wired. The elements are now as shown in FIGURE 6.

The next operation involves rotating the bit through half a revolution to clear the wire from the axial hole of the bit. The bit is moved rightward or leftward with respect to the feed tube so that the bit is actually over the terminal to be wrapped. We have now reached the condition shown in FIGURE 7, which (like FIGURE 3) is a plan view, As yet neither the fork nor the grippers has had any function to perform.

When the head is positioned for wrapping, the feed tube is always positioned midway between two adjacent rows of terminals so that it lays the wire out in a path between those rows. Initially, as in FIGURE 3, the bit is aligned with the tube to receive the wire for stripping. However, after the stripping, the bit is moved right or left under control of the tape program to bring it over the terminal to be wrapped.

Figure 8:
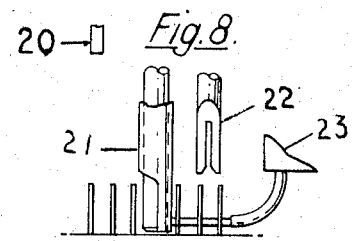
Figure 9:
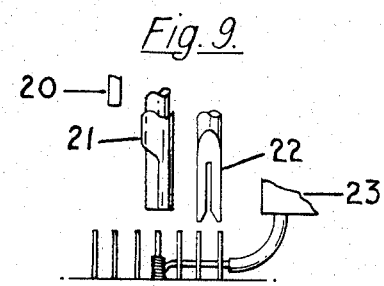

In the next operation, the bit and feed tube are lowered to reach the condition of FIGURE 8, in which the bit fits over the terminal to be wrapped. The bit is now rotated to wrap, and raised to reach the position shown in FIGURE 9, in which the wire is wrapped on the terminal. It will be noted that the hook portion of the bit's outer sleeve, which hook portion formed the stripper, is now on the opposite side of the bit, as compared with FIGURE 3.

A small and predetermined amount of wire is now fed from the feed tube to release the tension on the terminal, and, assuming that a bend is needed in the wire before it reaches the next terminal, the table is moved so that the head unit reaches a position with respect to the work which is appropriate to the first bend. During the table movement, wire is fed out of the tube at the same rate as the table moves. At the first bending point, the bit is centered with respect to the two adjacent rows by a suitable movement of the table so that the condition of FIGURE 10 has been reached.

Next the feed tube is raised to cause the wire to be engaged between the two lines of the fork, as is shown in FIGURE 11. The whole head is now rotated through 90° so that the condition is now as shown in FIGURE 12. This rotation is about the axis of the fork, so that the wire is bent, as shown in FIGURE 12. It should be noted that, while the head is rotating, the fork is also rotating but in the opposite direction. Hence, the fork remains stationary as "seen" by the wire actually in the fork, so that the feed tube, in effect, bends the wire around the fork.

The feed tube is next lowered so as to disengage the wire from the fork, and the table is moved to the next position at which a wrap is required. During this movement, the bending fork is rotated through 90° for the disengagement.

When all the required bends are made and the table is so placed that the head is in position for the second wrapping to be made, that is, the wrapping for the other end of the wire, the condition of FIGURE 14 is reached. The bit is now moved to one side to reach the condition of FIGURE 15.

In this condition, the feed tube is raised and the grippers closed so as to grip the wire. At the same time, the stripping-hook portion of the bit's outer sleeve descends below the bottom of the wrapping bit so that the condition of FIGURE 16 is reached.

Next the bit returns to its central position in alignment with the feed tube as illustrated in FIGURE 17 and also FIGURE 1, thus gathering the wire into the stripper. The feed tube now moves back (i.e. to the left in FIGURE 18) to cut the wire and to clear the cut length from the tube. The hook is then raised to strip the wire, and the stripped insulation is blown away. This condition is illustrated in FIGURE 19 and FIGURE 2. The hook then descends as in FIGURE 20, and the bit is moved over the terminal. The wire is still being gripped by the grippers, and the feed tube is returned to its rest position as shown in FIGURE 21.

The bit is now lowered over the terminal, the grippers moving at this time with the bit, so that we have reached the condition of FIGURE 22. The bit is now rotated to perform the wrap. Then the bit is raised, and the grippers are released and raised so that the condition of FIGURE 23 is reached.

The above sequence of operations is performed for every pair of terminals which have to be wired together.

It is to be understood that the foregoing description of specific examples of this invention is made by way of example only and is not to be considered as a limitation on its scope, which is defined in the appended claims.

What we claim is:

1. A head unit for a machine for wiring an electrical circuit board,
    said machine comprising a table for supporting said circuit board to be wired,
    means for positioning said board with respect to said head unit,
    said positioning being affected by moving said table in a coordinate manner,
    said head unit including a wire-wrapping device,
    a wire feed device adapted to feed wire to said wire-wrapping device for completing connections between terminals on board being wired,
    a bending device for bending wire to change its direction across a board being wired, and
    control apparatus for controlling the movement of said wire-wrapping device,
    said wire feed device, said bending device, and said table,
    said control apparatus being adapted to enable interconnection of terminals on a board in accordance with a predetermined pattern.

2. A head unit in accordance with claim 1, in which said control apparatus includes a plurality of hydraulic-cylinder devices for controllably moving the said devices included in said head unit.

3. A head unit in accordance with claim 1, in which said control apparatus includes a plurality of mechanical actuators for the devices in said head unit.

4. A head unit in accordance with claim 1, in which said wire-feed device includes a bent tube for passing the wire to said wire-wrapping device, the end of said tube being so oriented that the wire leaves it in a direction substantially parallel to the surface of the circuit board being wired.

5. A head unit as in claim 4, in which said bent tube is movable in a plane substantially parallel to the surface of the board being wired, said movement being toward and away from said wrapping device.

6. A head unit for a machine for wiring an electrical circuit board,
    said head unit including a wire-wrapping device for wrapping wire around terminals,
    a bending device for bending wire to change its direction across the board,
    a wire feed device adapted to feed wires to said wire-wrapping device, and
    for completing connections between terminals on a board being wired, said wire feed device comprising a bent tube for passing the wire to said wrapping device, the end of said tube being so oriented that the wire leaves it in a direction substantially parallel to the surface of the circuit board being wired, said bent tube being movable in a plane substantially parallel to the surface of the board being wired, said movement being toward and away from said wrapping device, said bent tube being further movable toward and away from the board being wired, said movement occurring independently of the movement of the wire-wrapping device or of the bending device, the movement away from the board allowing the wire to be engaged with said bending device, and the movement toward the board allowing the wire to be disengaged from said bending device, and control apparatus for said wire-wrapping device, said wire feed device and said bending device, said control apparatus being adapted to permit interconnection of terminals on a board and in accordance with a predetermined pattern.

7. A head unit as in claim 6, in which, when a terminal is to receive a wrapping, the wrapping device is settable to a position over said terminal and then lowerable onto it, and in which said bent tube is also lowerable toward the circuit board during said lowering of said wrapping device.

8. A head unit as in claim 6, in which said bending device is a vertically extending member with a forked end, the wire being engageable between the tines of said forked end.

9. A head unit as in claim 8, said head unit being rotatable in its entirety to permit the wire to leave the bent tube in a desired new direction and said bending device being rotatable in the reverse sense during said rotation of said head unit.

10. A head as in claim 9, the normal position of the bent tube being such as to feed wire to a circuit board between two adjacent parallel lines along which terminals may be disposed, said wire-wrapping device in its normal position being aligned with said tube, and said wrapping device being sideways movable preparatory to the performance of each wrap.

11. A head unit in accordance with claim 1, further including grippers which are normally out of engagement with the wire while wiring is in progress but which are brought into engagement therewith to hold the wire while a terminating wrapped joint is being made.

12. A machine for wiring electrical circuit boards, said machine having a head unit as set forth in claim 1, and further including a table for supporting a circuit board to be wired, means for positioning said board with respect to said head unit, said positioning being effected in a coordinate manner, and tape-controlled apparatus for controlling the respective movements of said table and of said head unit.

References Cited

UNITED STATES PATENTS

| | | | |
|---|---|---|---|
| 2,696,656 | 12/1954 | Madden | 140—93 |
| 2,905,400 | 9/1959 | Mallina | 140—93 |
| 2,969,827 | 1/1961 | Rosenthal et al. | 140—1 |
| 3,185,183 | 5/1965 | Loy | 140—115 |

CHARLES W. LANHAM, *Primary Examiner.*

LOWELL A. LARSON, *Assistant Examiner.*

U.S. Cl. X. R.

29—203; 140—93

UNITED STATES PATENT OFFICE
CERTIFICATE OF CORRECTION

Patent No. 3,435,858            April 1, 1969

Patrick Arnold Taysom et al.

It is certified that error appears in the above identified patent and that said Letters Patent are hereby corrected as shown below:

In the heading to the printed specification, after line 7, insert -- Claims priority, application Great Britain, Aug. 3, 1965, 33185/65 --.

Signed and sealed this 7th day of July 1970.

(SEAL)

Attest:

Edward M. Fletcher, Jr.

Attesting Officer

WILLIAM E. SCHUYLER, JR

Commissioner of Patents